United States Patent [19]
Hansen et al.

[11] 3,946,946
[45] Mar. 30, 1976

[54] SELF PROPELLED SPRINKLING IRRIGATION APPARATUS

[75] Inventors: James E. Hansen, Lubbock; James L. Jackson, Houston, both of Tex.

[73] Assignee: Gifford-Hill & Company, Inc., Dallas, Tex.

[22] Filed: June 23, 1975

[21] Appl. No.: 589,143

[52] U.S. Cl. ................ 239/177; 239/212; 137/344
[51] Int. Cl.² ...................... A01G 25/02; B05B 3/00
[58] Field of Search ........... 239/177, 212, 213, 178, 239/185, 188; 137/344

[56] References Cited
UNITED STATES PATENTS

| | | | |
|---|---|---|---|
| 3,335,958 | 8/1967 | Wallace | 239/177 |
| 3,608,826 | 9/1971 | Reinke | 239/177 |
| 3,672,572 | 6/1972 | Delfs | 137/344 X |
| 3,720,374 | 3/1973 | Ross | 239/177 |
| 3,766,937 | 10/1973 | Lundvall et al. | 239/212 X |
| 3,831,692 | 8/1974 | Fry | 239/177 X |

*Primary Examiner*—Robert S. Ward, Jr.

[57] ABSTRACT

Self propelled sprinkling irrigation apparatus according to the present invention includes an elongated pipe line for transporting water which pipe line includes a plurality of interconnected pipe spans each having sprinkler mechanisms carried thereby for distribution of the water. A pair of tension elements is provided for each pipe span, the tension elements being connected adjacent the extremities of each pipe span. A plurality of pair of load supporting elements are spaced along each of the pipe spans, the load supporting elements being interposed between the pipe and the tension elements and additionally are disposed in substantially normal relation to the respective pipe span and tension element. A transverse brace is interposed between each of the pairs of load supporting elements and maintains the load supporting elements in stabilized diverging relation. A single stabilizer brace element is provided for each of the pairs of load supporting elements and extends between the pipe span and one of the tension elements and is disposed in angular relation with the pipe span, the load supporting elements and the tension element. The stabilizer elements cooperating with successive pairs of the load carrying elements are connected to opposite ones of the tension elements thereby disposing the stabilizer elements in alternating directly connected relation with one of the load carrying elements of each pair of load carrying elements. The other load carrying element of each pair is indirectly but positively supported in space by support forces transmitted through the tension element to which the same is connected.

7 Claims, 5 Drawing Figures

U.S. Patent   March 30, 1976   3,946,946
FIG. 1
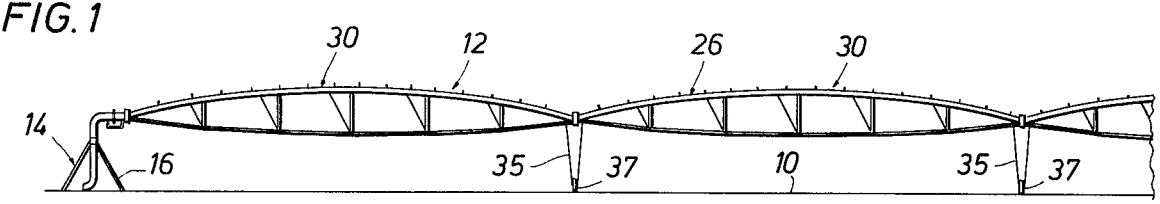
FIG. 2
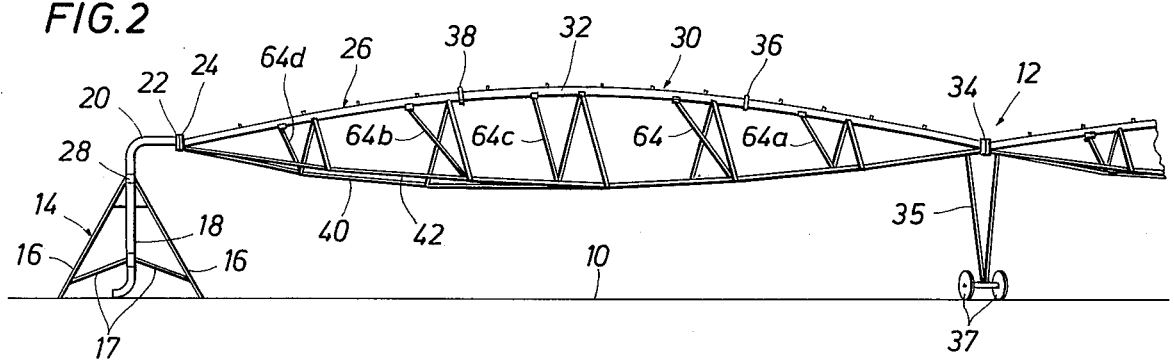
FIG. 3
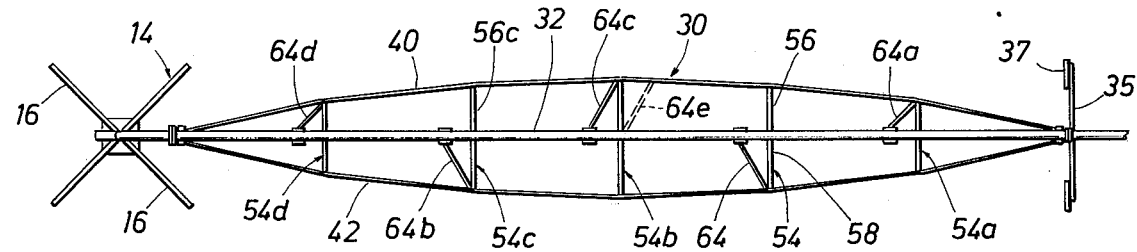
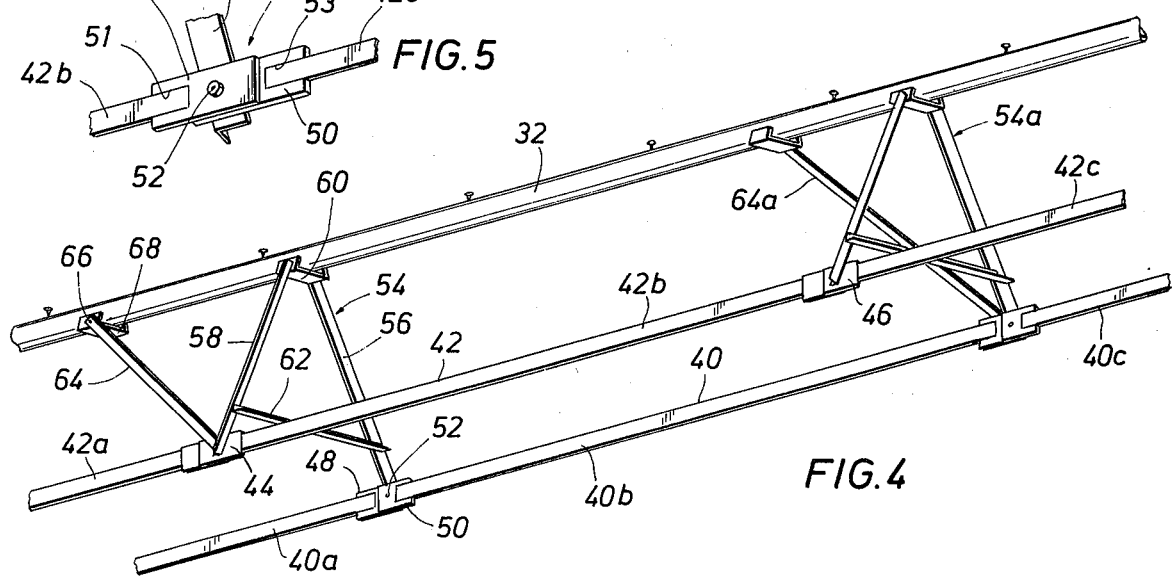
FIG. 5
FIG. 4

SELF PROPELLED SPRINKLING IRRIGATION APPARATUS

FIELD OF THE INVENTION

The present invention relates generally to fluid sprinkling and spraying apparatus of the type utilized for irrigation of large land areas and which comprises a self propelled boom structure composed of a plurality of truss spans or sections that are interconnected in such manner that articulation is allowed between the spans. More specifically, the invention pertains to an improved truss structure for self propelled sprinkling type irrigation systems, which truss structure incorporates a lesser number of structural elements and braces than is typical in conventional truss systems and which employs a unique cooperative relationship of structural components that effectively promotes the development of truss systems of exceptional strength and stability.

BACKGROUND OF THE INVENTION

Self propelled sprinkler type irrigation mechanisms have been utilized for a considerable period of time and such devices may take a number of different forms depending upon the characteristics of the irrigation process to be accomplished. For example, U.S. Pat. No. 2,892,593 (Smeltzer) discloses sprinkler irrigation apparatus of the ambulant type, which apparatus revolves around a pivot post that also provides a supply of water for irrigation. U.S. Pat. No. 3,352,493 (Curtis) teaches the provision of a sprinkler type irrigation system which is capable of drawing water from a ditch and propelling itself in straight line fashion across a field to be irrigated. Wagner U.S. Pat. No. 3,729,140 teaches the use of a longitudinally movable wheeled sprinkler system that may be towed in any suitable fashion while Curtis et al. U.S. Pat. No. 3,314,608 shows the use of a wheel supported and driven sprinkler mechanism that revolves around a water supply post.

Most self propelled irrigation systems, regardless of the specific characteristics thereof, utilize elongated pipe sections for transporting water from a water supply source to the various sprinkler heads that are incorporated into the sprinkler mechanism. Wheels, or other motive devices typically support the apparatus and move the apparatus over the land area to be irrigated. It is desirable that the apparatus be supported by as few wheels as possible to limit the amount of land that is disturbed by the wheels as the apparatus traverses the land area. It is desirable, therefore, to place the wheels or other motive devices as far apart as possible in order to limit the amount of unused land area or crop interference that occurs in the land area being irrigated. For example, if the crop to be irrigated is cotton, wheels or other motive devices rolling through the cotton field will prevent growth of cotton plants within certain limits in the area of contact between the motive devices and the ground. It is therefore desirable to have as few motive devices as possible in the field being irrigated without sacrificing the structural integrity of the irrigation system.

The sections of water supply pipe, which are typically composed of steel, aluminum or other suitable materials, together with the water contained therein are quite heavy and must be structurally supported. As shown by the U.S. Pat. to Curtis, No. 3,352,493, overhead cable type pipe support assemblies may be utilized. Pipe support truss structures may also be employed wherein tensioning devices are employed to restrain movement of the extremities of the water supply pipe as taught by Wallace U.S. Pat. No. 3,335,958.

Where tension support type water pipe support trusses are employed and water supply pipes of exceptional length are also employed, it is typical for the support truss system to incorporate a large number of brace components between the tension elements and the pipe in order to lend sufficient structural integrity to the structure to restrain the loads that lend to subject the structure to twisting or bending during operation thereof. Most truss systems that incorporate long truss spans employ a plurality of inclined supports at each support position between the water pipe and tension elements of the truss as taught by Reinke. This is necessary because of the combined bending and twisting loads to which the truss spans are typically subjected during operation. Moreover, since the braces that are utilized are typically composed of steel and are also quite heavy of their own nature, the practical length of the truss sections is limited to some degree by the weight of the brace structures.

It is therefore a primary object of the present invention to provide a novel support truss mechanism for self propelled sprinkler type irrigation machines that incorporates a plurality of load supporting brace systems that cooperate one with other structural components of the truss structure to provide a support truss structure of exceptional strength and durability.

It is an even further object of the present invention to provide a novel support truss structure for self propelled irrigation machines wherein a plurality of braces are employed that are alternately related in such manner that one stabilized brace structure lends cooperative structural integrity to adjacent brace structures by providing support therefor through tension elements to which the brace structures are interconnected.

Among the several objects of the present invention is noted the contemplation of a novel water supply support truss structure for self propelled irrigation systems, wherein tension support elements that may be straight or arcuately configured are disposed in cooperative relationship with a straight or arcuately configured water supply pipe section to provide a water supply support truss mechanism that effectively resists bending and twisting forces during irrigation operation of the mechanism.

It is an even further object of the present invention to provide a novel water supply support truss mechanism that is of simple design, is low in cost and reliable in use.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that the detailed description is not to be taken as limiting the scope of the present invention.

SUMMARY OF THE INVENTION

The present invention is directed to self propelled sprinkling irrigation apparatus for irrigating large land areas such as fields of crops, for example, wherein the apparatus comprises a pipe line composed of a plurality of interconnected pipe spans that are disposed in movable articulated relationship. The water supply pipe of each of the spans may be straight or may be of generally arcuate configuration between the end connections thereof, and, if arcuate, may have the arc of each pipe section facing upwardly and causing the central portion of the pipe span to be disposed at a level above the end connection of the pipe. A pair of tension elements are provided for each pipe span with the extremities of the tension elements connected adjacent the extremities of the pipe span, the tension elements restraining downward bending of the water pipe when the pipe is loaded with water.

A plurality of load supporting assemblies are provided for each of the pipe spans and are spaced along the length of the respective pipe span. Each of the load supporting assemblies cooperates with other structure to define a plurality of brace assemblies spaced along the length of the pipe span. Each of the load supporting assemblies is disposed in a plane that is disposed in substantially normal relation to the water pipe and includes a pair of elongated load supporting elements that are disposed in downwardly diverging relation one with the other, the lower extremities of the load supporting elements being connected to respective ones of the pair of tension elements and thereby maintaining the tension elements in spaced relation below and to either side of the water pipe structure. The water pipe and the tension elements are disposed in generally triangular relationship when viewed in cross section, with each of the load supporting elements of the load supporting assemblies providing equal support between the water pipe and the tension elements. A transverse brace is interposed between each of the pairs of load supporting elements and serves to maintain the load supporting elements in stabilized diverging relation and to maintain the tension elements in spaced and properly positioned relation below and to either side of the water pipe structure.

To prevent twisting loads from deforming the structure of the truss mechanism beyond allowable limits, a single stabilizer brace element is provided for each of the load supporting assemblies and extends between the pipe span and one of the tension elements. The stabilizer brace element is also disposed in angular relation with the pipe span, the load supporting elements and the respective tension element and cooperates with each of the structural elements of the truss system to serve a stabilizing function when the structural elements are subjected to tension and compression forces or to variable tension and compression forces. Stabilizer elements for successive pairs of the load carrying elements are connected to opposite ones of the tension elements, thereby allowing alternating ones of the stabilizer brace elements to lend structural integrity to otherwise unsupported brace structure disposed therebetween thereby causing the lower extremities of all of the load supporting elements to be fixed and restrained.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the preferred embodiment thereof illustrated in the appended drawings which drawings form a part of this specification.

It is to be noted, however, that the appended drawings illustrate only a typical embodiment of the invention and are therefore not to be considered limiting of its scope, for the invention may admit to other equally effective embodiments.

In the drawings:

FIG. 1 is an elevational view of overhead sprinkler type self propelled irrigation apparatus having a plurality of joined spans each being constructed in accordance with the present invention.

FIG. 2 is an enlarged elevational view similar to the elevational view of FIG. 1 and depicting the first truss section of the irrigation apparatus of FIG. 1 in detail.

FIG. 3 is a plan view of the irrigation apparatus of FIG. 2.

FIG. 4 is a fragmentary isometric view of the irrigation apparatus of FIGS. 1–3, illustrating the truss brace assemblies thereof in greater detail.

FIG. 5 is a fragmentary isometric view of the structure illustrated in FIG. 4, illustrating the structural details of the mechanical interconnection between the sections of the tension element and a load supporting element of the truss structure.

DESCRIPTION OF PREFERRED EMBODIMENT

Referring now to the drawings and first to FIG. 1 and 2, there is shown a land area at 10 that is to be irrigated by sprinkling water from overhead sprinkling apparatus as the apparatus traverses the land area. Apparatus for irrigation of the land area may, in accordance with the present invention, take the form of overhead type sprinkling apparatus, such as shown generally at 12, which may be referred to as circular irrigation apparatus, wherein a plurality of interconnected self-propelled elongated booms or spans revolve about a centrally located tower, illustrated generally at 14, which serves as a structural support for one extremity of the irrigation apparatus and also serves to supply water to the irrigation apparatus.

While the invention will be discussed herein as it relates to circular irrigation apparatus of the general type depicted in the drawings, it is to be borne in mind that the present invention may be incorporated in overhead irrigation apparatus of other general types without departing from the spirit and scope of the present invention. For example, interconnected self-propelled irrigation booms or spans may function to move across a land area in a substantially straight line, having a ditch or other elongated source as its water supply. The spans that are supported by self-propelling mechanisms such as the wheel driven type shown may be identical or substantially identical in straight line or circular type irrigation systems, if desired.

The tower 14, as best shown in FIGS. 2 and 3, will be located at the center of the land area to be irrigated and generally comprises a plurality of interrelated structural braces 16 and 17 that serve to support a water supply pipe 18 in generally vertical orientation, the water pipe being connected to a source of pressurized water, such as is produced by a conventional engine powered pump located at a water well site.

The water supply pipe 18 may include a generally horizontally disposed upper section 20 having a connector 22 provided thereon which receives a connector 24 provided on a water pipe 26 defined by a plurality of water pipe sections. The water supply conduit 18 may also be provided with a swivel 28 that allows the upper section 22 of the water supply pipe to rotate relative to the lower section 18 thereof as the sprinkling mechanism rotates during irrigation operations.

In accordance with the present invention and as shown in detail in FIGS. 2 and 3, the overhead type irrigation apparatus 12 is composed of a plurality of spans illustrated generally at 30, which spans are joined together to define an elongated irrigation system that may be in the order of one quarter mile or greater in length. Each of the spans 30 may comprise an elongated section or span 32 of water pipe that may be of arcuate or flat configuration, each extremity of the water pipe being at generally the same level relative to the surface of the land area 10 while the central portion of the arcuate water pipe is positioned above the level of the extremities thereof. Sprinkler devices carried by the water pipe serve to distribute water as the irrigation mechanism traverses the land area to be irrigated. Each extremity of the water pipe span 32 may be provided with a connection, one being shown at 24 while the other is shown at 34 for interconnection of the water pipe 32 of the span is assembly with other span structure or in assembly with the centrally located water supply pipe 20, as described hereinabove. It is desirable, however, that the connections of the span, to other span structure and to the water supply pipe structure, of of flexible nature in order to allow a certain degree of universal movement. Because land areas in farming regions are seldom level, and because the linear arrangement of the spans may not be precisely straight at all times, a certain amount of angular misalignment must be compensated for by the connection structures.

In defining the water pipe span 32 of the boom structure, it may be desirable to provide two or more smaller sections of straight or arcuate water pipe and to join these sections in substantially rigid relationship by means of bolted flange connections, such as shown at 36 and 38 in FIG. 2.

The spans or span sections each include a motive device or self propelling device which moves the span sections over the land area. Although many different types of motive devices may be employed within the scope of this invention, electric motor driven span drive towers 35 supported by drive wheels 37, such as shown in FIGS. 1–3, may be employed.

Each of the span sections may also define a support truss that is supported at each extremity and which includes a pair of tension elements 40 and 42 that are connected to the water pipe section 32 adjacent each extremity thereof and serve when arcuate water pipe is employed to maintain the water pipe span in an upwardly bowed or arcuate configuration, resisting the forces attributed by the weight of the truss, the weight of the water that is being transported through the water pipe structure and the weight of brace assemblies of the truss structure.

The tension elements 40 and 42 may in fact comprise a plurality of individual sections, each of which is interconnected to form the elongated tension elements. For example, as illustrated in FIG. 4 the tension element 42 is shown to comprise individual sections 42a, 42b and 42c that are interconnected by means of connector plate assemblies 44 and 46.

Referring to FIG. 5, each of the connector plate assemblies may be constructed, as shown generally at 44, with a pair of connector segments 48 and 50 disposed in overlapping relationship and having aligned apertures through which a bolt 52 may extend to retain the segments in fixed relation one with the other. The bolt 52 may also extend through an aperture or apertures defined in one or more structural braces such as shown at 54, to define an interrelated structural support assembly.

The connector segments 48 and 50 may be of generally rectangular configuration and may be provided with recesses 51 and 53, respectively, within which the extremities of the tension elements 42b and 42c may be received. The extremities of the tension elements 42b and 42c may be located within respective ones of the recesses and may be welded or otherwise fixed to the connector segments 48 and 50. By utilizing connector segments of greater strength than the tension elements connected thereto, a structural interconnection may be established between the tension elements and brace structures of the span assembly that is exceptionally durable and yet the overall weight of the tensioning system will remain quite low, thereby contributing to the establishment of a light weight truss system for the truss structure that effectively facilitates development of a truss structure of exceptional length.

In the truss structure of the span, it is desirable that means be provided to establish a supporting function between the tensioning elements and the water pipe section 32. In accordance with the present invention, supporting brace assemblies may be provide, as shown generally at 54 in FIG. 4, each of which may comprise a pair of weight supporting elements 56 and 58 that are bolted or otherwise fixed to brace connector elements 60. The connector elements 60 may be welded or otherwise fixed to the water pipe 32. The weight supporting brace elements 56 and 58 may be disposed in downwardly diverging relationship and may lie within a plane that is disposed in substantially normal relationship with the water pipe 32 when viewed in plan. The lower extremities of the brace elements 58 and 56 may be secured to the tensioning system by means of the bolts 52 that pass through the connector segments 48 and 50 and through the respective brace element 56 in the manner shown in FIG. 5. A generally horizontally disposed transverse brace 62 may have its extremities connected to the brace elements 56 and 58 by bolting or by any other suitable means of connection and may serve to retain the support braces 56 and 58 in properly oriented spaced relationship and to maintain proper spacing of the tension elements 40 and 42.

It will be desirable to prevent twisting of the truss structure of the span and to maintain the support elements 56 and 58 together with the transverse brace 62 in a plane that is substantially normal to the water pipe 32 when viewed in plan. It is also desirable that the structural brace system for maintaining proper positioning of the support brace assemblies 54 be as light weight as possible without sacrificing structural integrity of the boom truss system. In the past, as mentioned hereinabove, it has been the practice to utilize a plurality of combination load supporting and bracing elements between the tension elements and the water pipe to provide a supporting function and to prevent twisting of the span. To provide a proper load supporting function and to prevent twisting it is necessary to provide positive support at each extremity of the load supporting elements of the truss system between the water pipe and the tension elements. In accordance with the present invention, means for maintaining the generally vertical or normal relationship of the support brace structures may conveniently take the form of a single stabilizer brace element provided for each of the load supporting brace assemblies 54-54a, etc., and which single stabilizer brace element serves to directly stabilize one of the load supporting elements of the load supporting brace structure and also serves to indirectly stabilize the unsupported extremities of adjacent load supporting elements of the truss structure.

As shown in FIG. 4, stabilizer brace element 64 may have its lower extremity connected to the tension element 42 at the point of juncture between the load supporting element 58 and the connection between the sections 42a and 42b of the tensioning element 42. The upper extremity of the stabilizer brace element 64 may be connected by a bolt 66, or by any other suitable means of connection, to a stabilizer brace connector element 68 that may be secured to the water pipe section 32 by welding or the like.

As shown in FIG. 4, the single stabilizer brace element 64a for the adjacent support brace assembly 54a will be connected to the tension element 40 and the water pipe structure 32 in the same manner as the stabilizer brace element 64, but the stabilizer brace element 64a will extend from the opposite tension element to the water pipe section.

As illustrated in plan in FIG. 3, the single stabilizer brace 64 stabilizes the lower extremity of the load supporting brace element 58 and allows the interconnection between the lower extremity of the load supporting element 56 and the tension element 40 to remain unsupported. A stabilizer brace element 64, in addition to stabilizing the load supporting assembly 58, also provide stabilization for the unsupported lower extremities of the adjacent support brace assemblies such as shown at 54a and 54b thereby fixing points 54a and 54b in space. Likewise, stabilizer brace element 64b provides immediate structural support for the lower extremity of one of the support brace elements of the support brace assembly 54c, while providing indirect structural support for the unsupported support brace elements of the adjacent support brace assemblies 54b and 54d.

On the opposite side of the truss structure, as viewed in plan in FIG. 3, the unsupported lower extremity of the support brace element 56 obtains structural support from the adjacent single stabilizer brace elements 64a and 64c. The same functional and structural association occurs with respect to the support brace assembly 54c. The unsupported load supporting element of the load supporting brace assembly 56c obtains structural stabilization from the adjacent single stabilizer brace elements 64c and 64d and also from the function of the stabilizer brace element 64b, which acts through the transverse brace 54c.

By employing alternating single stabilizer brace elements for each of the support brace assemblies, the weight of the span truss structure can be effectively maintained at a minimum without sacrificing from the standpoint of structural stability. The cooperative relationships between the stabilizer brace elements and the adjacent unsupported extremities of adjacent brace assemblies, effectively accomplishes sufficient stabilization of the entire structure to prevent the span truss structure from twisting or bending as forces are applied to the truss structure during movement thereof over the land area. Moreover, the single stabilizer brace elements for each of the pairs of load supporting brace assemblies may comprise light weight structural elements such as simple angle or tubular brace members because of the characteristics of the loads applied thereto as the irrigation system is operated. The support braces, such as those shown at 56 and 58 in FIG. 4, must be of sufficient structural integrity to support the load applied thereto by the water pipe section 32 and, therefore, are typically of larger dimension than the dimension necessary for the stabilizer brace elements although the support braces and stabilizer braces may, if desired, be of the same dimension. The transverse structural braces, such as shown at 62 in FIG. 4, may also be defined by light weight structural elements such as simple light weight angle type braces, tubular braces, etc. The only structural elements that are utilized in establishing interconnection between the water pipe structure and the tensioning elements that provide a direct load supporting function are the support brace elements, such as shown at 56 and 58 in FIG. 4. Only the load supporting elements of the load supporting brace assemblies is required to be of sufficiently heavy construction to support the load of the pipe and the water contained therein. The resulting support brace assemblies for the span truss structure, including the single stabilizer brace elements, is low in overall weight, without sacrificing in any manner from the standpoint of structural integrity.

In view of the foregoing, the present invention promotes development of overhead type irrigation systems incorporating span truss structures that are relatively light weight and are exceptionally strong and durable in addition to being of low cost because of the limited number of parts thereof. The light weight nature of the span truss systems provided by the present invention effectively promotes development of span truss structures that can be exceptionally long, thereby facilitating minimum interference with crop growth in the land area being irrigated because of the optimum ratio of ground contact area of the motice devices to the total ground area being irrigated. Even though a minimum of structural elements are employed, a span truss structure is established that effectively resists twisting and bending forces that are applied thereto during utilization of the irrigation apparatus. These various features and advantages are effectively promoted by a novel water supply support truss structure having the plurality of stabilizer braces that are employed in support brace assemblies to establish supporting bracing function between a water pipe structure and tensioning elements. The support brace assemblies are alternatively related by the functional relation of the stabilizer braces thereto in such manner that one brace structure lends cooperative structural integrity to adjacent brace structures and causes each extremity of each load support element to be positively fixed in respect to other structural elements of the truss structure.

It is therefore seen that the present invention is one well adapted to attain all of the objects and advantages hereinabove set forth, together with other advantages, which will become obvious and inherent from a description of the apparatus itself. It will be understood that certain combinations and subcombinations are of utility and may be employed without reference to other features and subcombinations. That is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. Self-propelled sprinkling irrigation apparatus for irrigating large land areas, said apparatus comprising:
    a pipeline having a plurality of interconnected pipe spans having sprinkler mechanisms carried thereby for distribution of water;
    a pair of tension elements for each pipe span, said tension elements having the extremities thereof connected adjacent the extremities of said pipe spans;
    a plurality of pairs of load supporting elements for each of said pipe spans being spaced along the length of each respective pipe span, said pairs of load supporting elements being secured at one extremity thereof to said pipe span and extending in downwardly diverging relation from said pipe span, the lower extremities of said load supporting elements being connected to respective ones of said pair of tension elements;
    transverse brace means being interposed between each of said pairs of load supporting elements and maintaining said load supporting elements in stabilized diverging relation; and
    a single stabilizer brace element for each of said pairs of load supporting elements, each of said stabilizer braces extending between said pipe span and one of said tension elements and being disposed in angular relation with said pipe span, said load supporting elements and said tension element, said stabilizer elements of successive pairs of said load carrying elements being connected to opposite ones of said tension elements.

2. Self-propelled sprinkling irrigation apparatus as recited in claim 1, wherein:
    the upper extremities of each of said stabilizer brace elements is connected to said pipe section in spaced relation to the points of connection of said load supporting elements and said pipe section and the lower extremities of each of said stabilizer brace elements is connected to said respective one of said tension elements immediately adjacent the point of connection between said load supporting elements and the respective one of said tension elements.

3. Self-propelled sprinkling irrigation apparatus as recited in claim 1, wherein:
    each of said pipe sections is of arcuate configuration and has connection means at each extremity thereof, the curvature of said pipe sections extending upwardly from the level of said connection means; and
    said tension elements present a generally arcuate configuration, and extend downwardly and to either side, respectively, of the respective one of said pipe sections.

4. Self-propelled sprinkling irrigation apparatus as recited in claim 3, wherein:
    said tension elements extend both downwardly and laterally relative to a generally horizontal line extending between said connection means of said pipe sections.

5. Self-propelled sprinkling irrigation apparatus for irrigating large land areas, said apparatus comprising:
    a pipeline having a plurality of pipe sections having movable articulated connection therebetween and having a plurality of sprinkling elements carried thereby for distribution of water onto the land area to be irrigated;
    a pair of tension elements for each pipe section said tension elements having the extremities thereof connected adjacent the extremities of said pipe section;
    at least one pair of elongated load supporting elements for each of said pipe sections, said load supporting elements being secured at one extremity thereof to said pipe section and extending in diverging relation from said pipe section, the other extremities of said load supporting elements being connected to respective ones of said pair of tension elements;
    transverse brace means being interposed between each of said pairs of load supporting elements and maintaining the diverging relationship of said load supporting elements; and
    a single stabilizer brace element for said pair of load supporting elements, said stabilizer brace extending between said pipe section and one of said tension elements and being disposed in angular relation with said pipe section, said load supporting elements and said tension element.

6. Self-propelled sprinkling irrigation apparatus as recited in claim 5, wherein:
    the upper extremities of each of said stabilizer brace elements is connected to said pipe section in spaced relation to the points of connection of said load supporting elements and said pipe section and the lower extremities of each of said stabilizer brace elements is connected to said respective one of said tension elements adjacent the point of connection between said load supporting elements and the respective one of said tension elements.

7. Self-propelled sprinkling irrigation apparatus as recited in claim 5, wherein:
    each of said pipe sections is of generally arcuate configuration, the curvature thereof extending upwardly from the level connections of the pipe sections; and
    said tension elements present a generally arcuate configuration extending both downwardly and laterally relative to a horizontal line extending between the connections of said pipe sections.

* * * * *